(12) United States Patent
Wu et al.

(10) Patent No.: US 7,069,045 B2
(45) Date of Patent: Jun. 27, 2006

(54) SEAMLESS INTEGRATED NETWORK SYSTEM FOR WIRELESS COMMUNICATION SYSTEMS

(75) Inventors: Gang Wu, Koganei (JP); Mitsuhiko Mizuno, Koganei (JP); Yoshihiro Hase, Koganei (JP); Paul J. M. Havinga, Enschede (NL)

(73) Assignee: Communications Research Laboratory, Independent Administrative Institution, Tokyo (JP)

( * ) Notice: Subject to any disclaimer, the term of this patent is extended or adjusted under 35 U.S.C. 154(b) by 350 days.

(21) Appl. No.: 10/092,249

(22) Filed: Mar. 7, 2002

(65) Prior Publication Data
US 2003/0050061 A1    Mar. 13, 2003

(30) Foreign Application Priority Data
Sep. 7, 2001    (JP) .............................. 2001-317471

(51) Int. Cl.
*H04B 1/38* (2006.01)
*H04M 1/00* (2006.01)
*H04Q 7/20* (2006.01)

(52) U.S. Cl. .................... 455/560; 455/561; 455/422.1; 455/426.1; 455/433

(58) Field of Classification Search ............. 455/422.1, 455/426.1, 433, 560, 561
See application file for complete search history.

(56) References Cited

OTHER PUBLICATIONS

Keller et al, "Convergence of Cellular and Broadcast Networks from a Multi-Radio Perspective", IEEE Personal Com.(vol. 8, No. 2, pp. 51-56), Apr. 2001.*
Wu et al, "Wireless Ineternet over Heterogeneous Wireless Networks", IEEE, pp. 1759-1765, 2001.*
Dillinger, "Advanced Spectrum Sharing Techniques", Siemens AG, 2000.*
Xu et al, "DRiVE-ing to the Internet: Dynamic Radio for IP Services in Vehicular Environments", IEEE , 2000.*
Blake et al., IETF RFC 2475, 1998.
Braden et al., IETF RFC 1633, 1994.
Campbell et al., IEEE Personal Communications, Special Issue on IP-based Mobile Telecommunications Networks, vol. 7, No. 4, pp. 42-49, Aug. 20, 2000.

(Continued)

*Primary Examiner*—Lee Nguyen
*Assistant Examiner*—Wen Huang
(74) *Attorney, Agent, or Firm*—Birch,Stewart,Kolasch & Birch,LLP (57) ABSTRACT

To create a network that connects a plurality of wireless communication systems to create optimal systems for various environments, and that seamlessly integrates the resulting systems together in order to provide more efficient and advanced service in general. A network system that can seamlessly integrate wireless communication systems employs a heterogeneous network architecture with at least four building blocks, including a mobile host 40, a wireless access network 41, a common core network 42, and an external network 43.

7 Claims, 3 Drawing Sheets

OTHER PUBLICATIONS

Daedalus Project, Berkeley, http:/daedalus.cs.berkeley.edu.
Deering et al., IETF RFC 2460, Dec. 1998.
Magic Wand Project, http://www.tik.ee.ethz.ch/~wand/.
Monarch Project, Rice University, http://www.monarch.cs.rice.edu.
Perkins, RFC 2002, Oct. 1996.
Pitoura et al., IEEE Transactions on Knowledge and Data Engineering, 2000.
Ramjee, et al., IEEE Personal Communications, pp. 34-41, Aug. 2000.
Rexhepi et al., Proceedings EUNICE 2000, Sixth EUNICE Open European Summer School, University of Twente, Enschede, the Netherlands, Sep. 13-15, 2000.
Tonjes et al., Mobile Summit 2000. Galway, Ireland, Oct. 1-4, 2000, http://ww.ist-drive.org/papers.html.
Walsh et al., 3$^{rd}$ Internat'l Symposium On Wireless Personal Multimedia Communications (WPMC '00) , pp. 109-114, Bangkok, Thailand, Nov. 2000.

* cited by examiner

Fig. 2

SEAMLESS INTEGRATED NETWORK SYSTEM FOR WIRELESS COMMUNICATION SYSTEMS

FIELD OF THE INVENTION

The present invention relates to a system that seamlessly integrates various wireless communication systems to increase efficiency. In particular, the present invention relates to the architecture of this system employing a heterogeneous network.

BACKGROUND OF THE INVENTION

Many specific proposals have been made regarding fourth-generation mobile communications which is to follow third-generation mobile communications, the introduction of which is near at hand. For example, fourth-generation mobile communications may enable mobile computing services featuring optimum connections up to a hundred megabits per second, regardless of location. If such communication is a mere extension of the current terrestrial system, high-speed services will be limited to specific areas (e.g., hot spot services). Thus, services at the minimum required transmission speed may be provided over wide areas, whereas high-speed transmission services may be provided in hot spots.

However, it is difficult to use a single radio system to provide services corresponding to various transmission speeds or QoS (Quality of Service: technology that optimally assigns bands in accordance with the purpose of communication to ensure proper response time and throughput required for communication), regardless of whether the services are provided in real time or accumulated.

Thus, in view of the conventional problems, an object of the present invention is to construct a plurality of wireless communication systems into systems that are optimum for corresponding environments and thereby create a network that can seamlessly integrate the resulting systems in order to provide generally more efficient advanced services.

In particular, the present invention provides a basic architecture for a seamless integrated network.

Identification of reference numerals used in the drawings is as follows: 40 Mobile Host, 41 WAN (Wireless Access Network), 42 Common Core Network, 43 External Network, 44 Corresponding Node, 45 Gateway Router, 46 Resource Manager, 47 Mobility Manager, 48 Base Station or Access Point, 49 Base Station or Access Point Interface, 50 Network Interface, 51 Basic Access Network, 52 Basic Access Component, 53 Network Interface, 54 Network Selector, 55 Locator, 56 Local Resource Manager.

DESCRIPTION OF THE PREFERRED EMBODIMENTS

To realize the above object, the present invention uses the following means:

The present invention provides a network system that enables wireless communication systems to integrate seamlessly, an architecture of the network system including at least four building blocks including a mobile host, a wireless access network, a common core network, and an external network.

The corresponding node is assumed to be located in the external network. The external network and the common core network are connected together via at least one gateway router. The building block of the common core network has two functional modules—are source manager and a mobility manager. The building block of the wireless access network internally comprises at least one set of base stations, or access point interfaces and base stations, or access point interfaces and network interfaces.

The base stations or the access point interfaces realize an access mechanism that enable access between the common core network and the base stations or access points. The network interface realizes an access mechanism that enables access between the base stations or access points and the mobile host.

A seamless integrated network system for wireless communication systems may also be constructed in the following manner: The building block of the common core network communicates with a basic access network. The basic access network is composed of base stations or access point interfaces, base stations or access points, and a basic access component. The mobile host is composed of at least one network interface, a network selector, a locator, a basic access component, and a local resource manager. The base stations of the basic access network and the basic access component of the mobile host communicate with each other.

An embodiment of a seamless integrated network system for wireless communication systems according to the present invention will be described below. The embodiment is not limited to the one described below but may be arbitrarily changed without deviating from the spirit of the present invention.

The present invention constructs a system based on a heterogeneous network, which is under development. A model of this network will be described.

Figure 1:
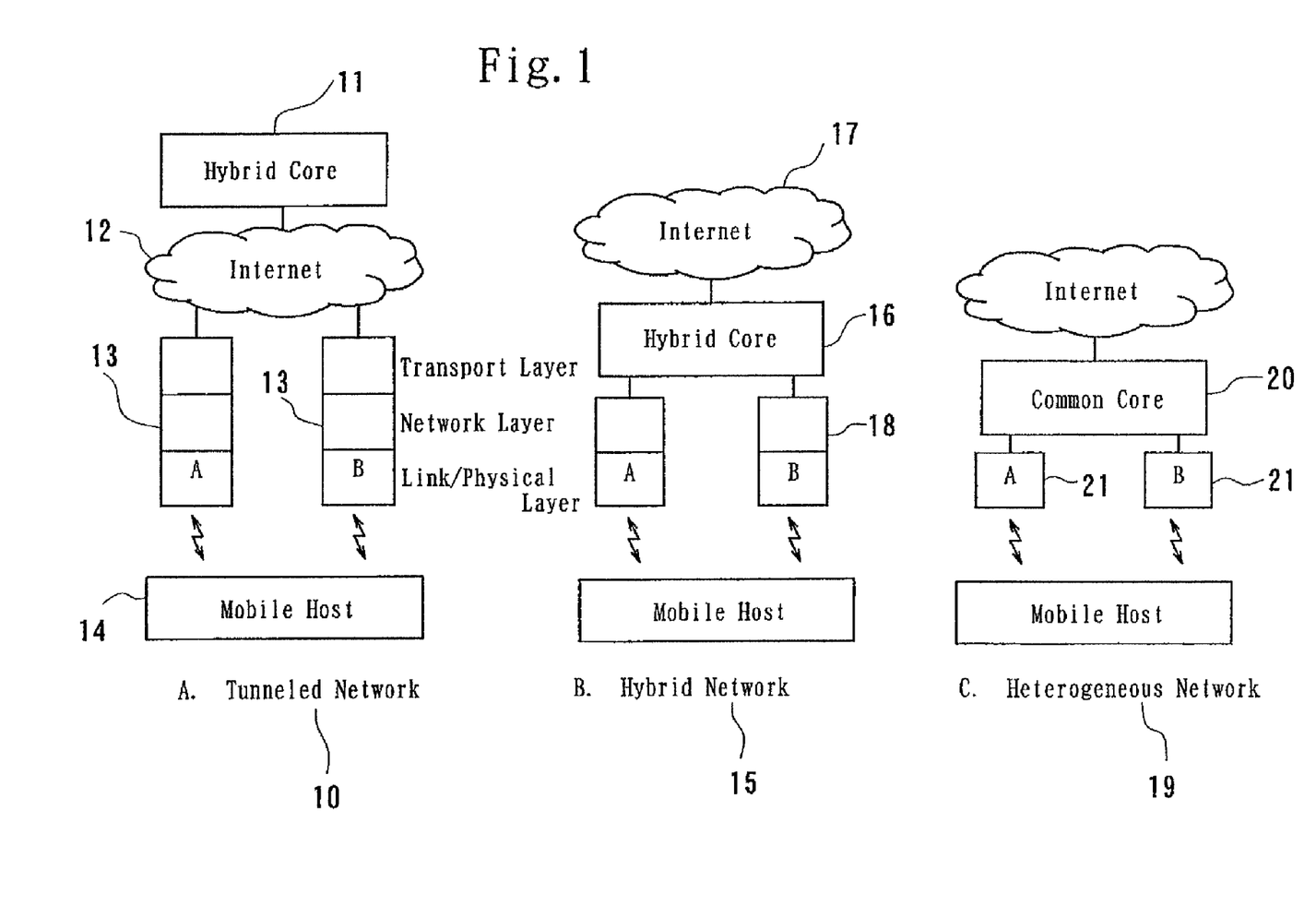
FIG. 1 is an explanatory diagram comparing several network structure models.

There are several architectures applying a plurality of different WANs in a heterogeneous network model. The basic models are illustrated in FIG. 1 by two WANS, network A and network B. The main distinction between these models is the layer on which the WAN communicate. Many derivates of these models are possible (see for example Tonjes, R. et al.: "Architecture for Future Generation Multi-access Wireless System with Dynamic Spectrum Allocation", Mobile Summit 2000. Galway, Ireland, 1–4. October 2000, http://www.ist-drive.org/papers.html.13).

In model A, or a tunneled network (10), a user has a service agreement with operators of several WANs independently.

Based on some policy, the optimal network for the requested service is selected.

The hybrid core (11) tunnels the traffic across the Internet (12), and the selected access network (13) to the mobile host (14).

Connectivity between networks is based on relatively higher network layers (e.g., transport layer) of seven-layer OSI model, resulting in increased service latency.

This system requires no modification to existing access networks. Moreover, they all have their own infrastructure, e.g., signaling, handover, and billing. This makes it very difficult for existing network systems to cooperate efficiently.

Model B, a hybrid network (15), is provided with a hybrid core (16) that interfaces directly between a WAN (18) and the Internet (17).

In this model the WAN (18) implements the network layer and below. Advantages are that in the model there will be less duplicate functions, and that it is able to offer advanced services at the network or data link layer (e.g. it can provide a better handover between the WANs).

Model C, a heterogeneous network (19), has a common core network CCN (20) that deals with all network functionality and operates as a single network. Different WANs (21), (22) handle only those functions specifically related to a distinct radio access technology.

In general the wireless access radio incorporates the physical and data link layers only.

Communication between WANs belonging to the CCN (20) is based on a lower network layer (a link layer or network layer) of the OSI model.

This reduces the overhead, and improves performance. A major challenge of this model is that the different WANs should converge, which requires a standardization effort and business commitment to support it.

The present invention is characterized in that the hybrid and heterogeneous networks are mutually distinguished. In general, various kinds of structures are often collectively referred to as "hybrid," but in the present invention, these structures are called "heterogeneous" to stress the fact that a plurality of access networks are simultaneously present and cooperate with each other.

The hybrid network corresponds to the conventional concept that one of plural networks is selected for use.

Currently, related work mainly is associated with routing and handoff aspects for wireless networks. The Mobile IP protocol (Perkins C., IP Mobility Support, RFC 2002, October 1996.) supports mobility transparently above the IP level and it allows the nodes to change their location.

Mobile IP is generally seen as a macro mobility solution. However, it is less suited for micro mobility management, in which a mobile host moves within a sub network.

A typical example of micro mobility is a handoff amongst neighbor wireless transceivers, each of which is covering only a very small geographical area. There have been quite a few proposals to support micro mobility (e.g. Cellular IP; (Campbell A. T., Gomez, J., Kim S., Turany i, Z., Wan, C-Y., Valko, A: "Design, Implementation and Evaluation of Cellular IP", IEEE Personal Communications, Special Issue on IP-based Mobile Telecommunications Networks, Vol. 7 No. 4, pg. 42–49, August 2000.), HAWAII (Ramjee R., La Porta T. F., Salgarelli L. , Thuel S., Varadhan K., Li L.: "IP-based Access network infrastructure for next-generation wireless data networks")).

The differences among all these schemes are related to the mechanisms used to route the packets within a local (home or foreign) domain.

Related work on QoS over Internet is mainly based on Integrated Services (Braden, R, Clark, D., Shenker, S., "Integrated Services in the Internet Architecture: An Overview", IETF RFC 1633, 1994.) and Differentiated Services (Blake, S., Black D., Carlson, M., Davies, E., Wang, Zh., Weiss, W., "An architecture for Differentiated Services", IETF RFC 2475, 1998.).

Other related research is mainly focusing on hybrid network architectures, or support for macro mobility (Daedalus project, Berkeley, http://daedalus.cs.berkeley.edu.) (Monarch project, CMU, http://www.monarch.cs.cmu.edu.).

Given ATM is able to support QoS, there has been strong interest in developing wireless ATM technologies (e.g. the Magic Wand project, http://www.tik.ee.ethz.ch/~wand/.).

Current work merely provides solutions to roaming mobile hosts by supporting protocols for mobility. Heterogeneous networks might be used, but more in the traditional sense of selecting one or the other.

According to the present invention, mobile hosts can communicate not only over a single WAN, but also over a plurality of WANs simultaneously.

The major challenge for the future generation wireless Internet is that the architecture will have to be very flexible and open, capable of supporting various types of networks, terminals and applications.

It is a fundamental object of the present invention to make the heterogeneous network invisible (seamless) to the user. In addition, a subject is to design the system architecture such that it is independent of the wireless access technology. These considerations lead to the following requirements:

First, a plurality of access technologies are the key to the success of software-defined radio (SDR), and each WAN can be optimized for certain services.

Next, heterogeneous access support is described. In a heterogeneous network it should be possible to use a combination of several networks, each of which is optimized for some particular service. Multiple differentiated flows can then be used to achieve better and cheaper connectivity.

Since it should be possible to use multiple WANs 'simultaneously', the SDR must be able to switch quickly between the various WANs.

For mobility management, seamless handovers are desirably carried out between homogeneous WANs and between heterogeneous WANs or between homogeneous technologies and between heterogeneous technologies. It is contemplated that wireless access technologies may be popularized, ranging from local point-to-point connections such as Bluetooth, which are made via wireless LANs, to first-, second-, and third-generation cellular systems.

The selection of the efficient configuration is also one of the requirements. An important motivation of a heterogeneous network is that it is possible to use a selection of several WANs.

The decision of selecting the most appropriate WAN(s) could be based on aspects like available bandwidth, energy consumption needed to perform the service, service classification, and cost.

The result is that each service is delivered via the network, which is most efficient to support this service.

Simple, efficient, scalable, low cost—all these requirements are closely related to each other. These requirements are of particular importance in the future pico-cellular networks in which access point offers tens to hundreds of megabits per second. It is not affordable to have many complex access points.

Energy efficiency is also an essential condition. It is generally expected that once wireless IP communication equipment is switched on, services are always accessible through the wireless Internet.

This implies that mechanisms for services like maintaining location information and wireless system discovery should be energy-efficient (and bandwidth efficient as well). Cellular systems employ the notion of passive connectivity to reduce the power consumption of idle mobile hosts.

Mobile systems are open to a number of security problems that do not exist in their-stationary counterparts.

Mobile hosts must update their location while moving. These location messages make impersonation possible unless properly secured.

In systems and applications in which seamless handoff is given top priority, information on session keys used by the mobile hosts must be immediately available at a new base station or access point during handoff.

In the last condition, it is desirable to be provided with end-to-end QoS mechanism.

Since the WANs provide services that are specialized for some service, QoS aspects in heterogeneous networks are of prominent importance.

End-to-end QoS implies that interoperation with local QoS mechanisms should be possible, but also that lower layer protocols (link and physical layer) should be aware of the traffic characteristics and so be able to meet the different requirements of QoS.

It should be noted that some of these requirements are closely related to each other. Solving the research challenge for one requirement may solve others.

Accordingly, to the maximum possible extend, efforts should focus on constructing structures based on existing protocols to make the existing protocols and applications compatible with each other, while minimizing the required time and labor.

Solutions to these requirements have been examined on the basis of the following three major entities:

The first major entity is a multi-service terminal. The multi-service terminal is equipped with a multi-radio system. Each terminal has the Basic Access Component (BAC) to communicate with the basic access network (BAN).

Apart from this radio system, the multi-service terminal is equipped with one or more radio subsystems to access the CCN. These subsystems are essentially (or preferably) based on SDR technologies, which allow the terminal to adapt its radio hardware to the wireless infrastructure available and required.

The second major entity is a basic access network. It provides the common access of all multi-service terminals to the common platform.

The network is basically used to provide the signaling, wireless system discovery, and location management for all other wireless systems. To support this, it should have a large coverage area, preferably larger than the WANs it supports. The BAN is accessed using the BAC.

The third major entity is a common core network. This network provides the common platform through which all multi-service terminals communicate with correspondent nodes residing in external networks.

In principal all access points of the WANs are connected to this network. The network provides routing and seamless handovers between the WANs.

In this way a natural integration of the various heterogeneous networks is achieved.

The main functional entity of the CCN is the Resource Manager, which coordinates the traffic distribution, and selects the WAN. It has a common database for managing users' profiles with entries like authentication, preferred access system, billing, policy, users' terminal capabilities, etc.

Figure 2:
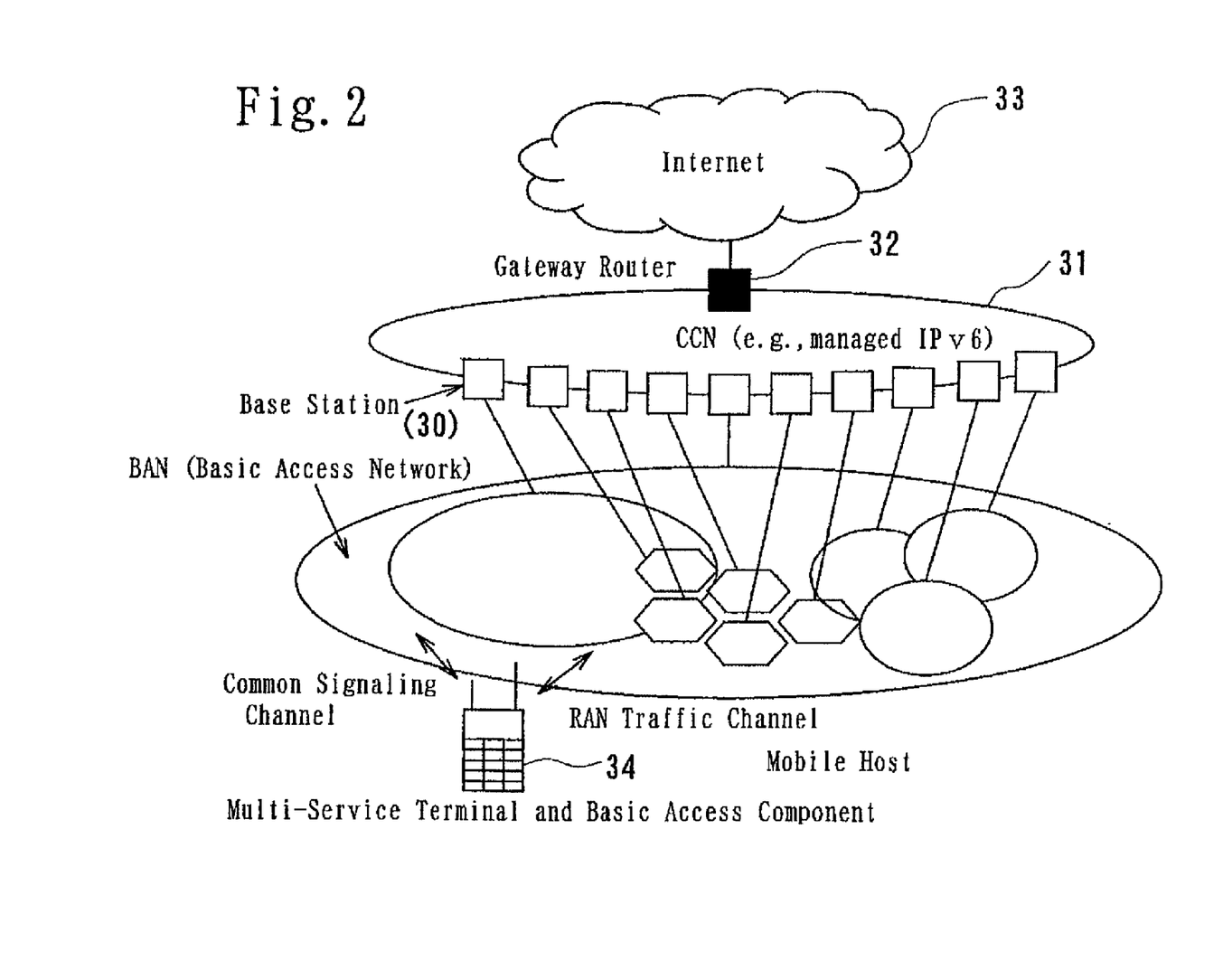
FIG. 2 is a conceptual drawing of the structure according to the present invention.

The structure according to the present invention provides communication between mobile hosts and correspondent nodes residing in external networks. FIG. 2 shows a conceptual overview of the architecture. The universal component in this structure is a base station or access point (30) that serves as a wireless access point and interfaces with a CCN (31).

CCNs (31) are connected to the Internet (33) via gateway routers (32). A CCN (31) provides services for several WANs. In general the WANs will overlap, and a mobile host (34) can have access to several WANs at one location. The area covered by these wireless networks can be quite large.

Macromobility is implemented using a mobile IPv6 in CCN. The CCN with high-speed wireless access with frequent location updates requires micro mobility. Mobile hosts attached to the base station or access point use the IP address of a corresponding gateway as a mobile IP care-of address. Inside the CCN, mobile hosts are identified by their home address. The base station or access point is connected to a regular IP forwarding engine.

Such engines are connected via a network topology that allows packets to be transmitted between the base station or access point and the gateway.

In the present invention, the base station is equal to a wireless access point, but the present invention is not limited to this aspect. Some wireless access providers use their own network, including interconnected access points, and share one base station or access point to connect it to the core network. An important concept of the present structure is a degree of simplification required to implement an inexpensive network. The concept of CCN and independent BAN offers providers of wireless services the possibility to setup an infrastructure with little investments. New providers can easily connect to the core network, provided that they use the correct interface.

They do not need to have their own infrastructure ready before they can start their business, but instead use the infrastructure provided by the core and BAN. All they have to do is to develop their wireless service, and concentrate on the wireless access only.

The infrastructure that is generally needed to setup a whole new service is already provided by the architecture. This involves both technical problems (e.g., a network connecting base stations or access points, and associated routings, handoffs, and Internet accesses) and business problems (e.g., billing and management of consumer profiles). The components that must be constructed are base stations or access points and an access mechanism for terminals. Typically, the access mechanism may be a software module suitable for use in multi-service terminals.

A consumer may have a contract with the CCN provider, and buy various services (provided by a WAN) from it. If the consumer has a contract that enables him to use multiple services, then the system and the user is able to select the most appropriate service. Access networks may also be combined to increase the available capacity.

Different access networks might also be used for uplink and downlink traffic. This can be advantageous for user applications like web browsing and e-mail, which in many cases are asymmetrical in nature causing more downlink than uplink bandwidth.

The result is that each service is delivered via the network that is most efficient (in many perspectives) to support the service. In effect, the consumer is unaware of the wireless technologies used to provide the service.

The structure of the present invention uses two distinct networks, i.e., the BAN for signaling related traffic common to some systems and the CCN for data traffic itself.

This is because it is often advantageous in various aspects to separate the signaling network and the real data-traffic network.

First of all, the BAN can provide wireless system discovery. The BAN delivers the common access; every mobile host is capable of using this BAN. The network provides the terminal with information about the currently available wireless networks, so that the terminal is not forced to scan all possible variants.

The BAN is used as the signaling network to enable mobility. Such a dedicated network can provide this service efficiently and securely.

The BAN is also used for paging. In a mobile environment it is very important to be energy efficient since a terminal relies on its batteries to operate. We expect that the wireless IP communicators will be on-line continuously, although not be actively communicating most of the time.

In essence, mobile hosts will be in an idle state, but passively connected to the network infrastructure. It is then extremely inefficient to have to scan all networks, and wait for a paging message.

Moreover, since the wireless networks are optimized for some special services, it is very likely that they are not efficient for paging messages. A wireless network that is optimized for this kind of traffic is more efficient.

The BAN can provide the infrastructure to allow mobile hosts to determine their location. This information can on its turn be used by the BAN to provide the mobile the information about the available service in its region. Location management is further important for roaming and paging.

The BAN is used as the medium for most signaling and control messages. This simplifies the design of a new wireless access service, since the signaling is being performed by another entity (the basic access component).

With a heterogeneous structure in which a plurality of WANs can be used substantially simultaneously, a network access synchronization mechanism must be provided to notify multi-service terminals when to tune to another access network. The BAN can provide such a service straightforwardly.

Finally, the BAN can also be used as a wireless access service. It is, however, primarily suitable to provide some very low bandwidth messaging services like paging and broadcasting.

Since the BAN is mainly used for small messages, the speed is of less importance; the total capacity, however, must be sufficient for a large number of mobile hosts.

Enabling end-to-end QoS over Internet is a tough venture, because it introduces complexity starting from applications, different networking layers and network architectures, but also in network management and business models (IEEE Personal Communications, pp. 34–41, August 2000.).

It becomes even more challenging when one is introducing QoS in an environment of mobile hosts, wireless networks, and different access technologies. Yet the need for QoS mechanisms in this environment is greater due to scarce resources, unpredictable available bandwidth and variable error rates. The heterogeneous network, to which different wireless networks with respective characteristics are applied, evidently requires the QoS mechanism.

Within the fixed Internet there are several ways to enable end-to-end QoS. Current work on QoS over IP architectures, i.e. Integrated Services and Differentiated Services seems to leave out mobility support, despite its importance.

The QoS approach can be divided into two parts: core network QoS and fixed network QoS services. In this way, the wireless IP (core) network is compatible with the fixed state-of-the-art QoS solutions. The gateway router provides merely the mapping between the Internet and the core network.

All IP communication is packet based relying on connectionless transmission. The addressing scheme does not enable the system to differentiate traffic flows.

The term traffic flow refers to the flow of IP packets that belong to the same connection, i.e. the IP packets that are sent between particular applications (port) and between particular hosts (IP addresses).

Traffic flows within the CCN are differentiated according to its service needs and QoS requirements. There are two main reasons for having such differentiated traffic flows:

First, these traffic flows are required to implement routings. In the present invention, a mobile host can have a plurality of flows for at least one service using a plurality of heterogeneous WANs. Each access network is used for the kind of service for which it is optimized.

Accordingly, packets for different services transmitted between the mobile host and the corresponding node can use different routes (i.e., different base stations and different access networks) over the CCN. The mobile host can thus simultaneously use at least one base station or access point to connect to the CCN.

The traffic between the mobile host and the base station or access point must be distinguishable on the basis of required services.

Second, these traffic flows are required to implement cross-layer interactions. In a wireless environment it is essential that the lower layer protocols are aware of the traffic characteristics. The Internet is implemented on the basis of the ISO/OSI hierarchy architecture, where the protocols for different layers are independent of each other.

For the wireless Internet, information on other layers may be required to improve overall performance and efficiency. For example, although the TCP specification contains no explicit reference to the characteristics of the lower layers, implicitly in the timeout and retransmission mechanisms there is the assumption that the error rate is low, and that the lost packets occur due to network congestion.

TCP has no way of distinguishing between packets corrupted by bit errors in the wireless channel from packets that are lost due to congestion in the network. Another example, for designing a wireless MAC and data link protocol, it is more efficient if the traffic characteristics are known in the MAC and data link layer.

Also, in W-CDMA systems, power control can be used to meet the different QoS requirements for different traffic. In other words, they all suppose to be able to know the traffic types even in the physical layer.

These examples attest the need to tailor protocols to the environment they operate in. Separating the design of the protocol from the context in which it exists leads to penalties in performance and energy consumption that are unacceptable for wireless, multimedia applications.

So, differentiating traffic flows is needed and useful. However, a challenging problem is how to detect these flows, and how to determine the QoS requirements for these flows. We can distinguish two major classes: explicit differentiation by using an application level signaling protocol, or implicit differentiation based on the traffic class.

First, the explicit differentiation should be described. Due to its future potential and advantages, IPv6 is selected as a protocol framework.

An important IPv6 feature is the introduction of flow labels to enable the labeling of packets belonging to particular traffic flows for which the sender requests special handling, such as non-default quality of service or real-time service (Deering S., Hinden R.: "Internet Protocol, Version 6 (IPv6), Specification", IETF RFC 2460, December 1998.).

It is currently not clear what level of granularity will be provided via the flow label. It is likely that many real-time applications will not employ the flow label, yet they want more than best-effort service.

Another issue in this case is to decide what QoS to provide this flow, since no QoS information is provided.

Second, Implicit differentiation should be described. Implicit flow detection can be based on various mechanisms. For example, the Diffserv QoS class can be mapped to the appropriate wireless QoS.

IPv6 also has an 8-bit Traffic Class field in its header. This field is available for use by originating nodes and/or forwarding routers to identify and distinguish between different classes or priorities of IPv6 packets.

At this moment it is not clear how this field will be employed, but there are a number of experiments underway to provide various forms of 'differentiated service' for IP packets, other than through the use of explicit flow set-up (Deering S., Hinden R.: "Internet Protocol, Version 6 (IPv6), Specification", IETF RFC 2460, December 1998.). Alternatively, one could also monitor the transport layer port numbers and forward IP datagrams with WWW or FTP traffic in a non best-effort fashion (the Magic Wand project, http://www.tik.ee.ethz.ch/~wand/.).

In the present invention, the CCN must contain a mechanism for routing flows to the mobile terminal using an efficient wireless network and a mechanism for exchanging information between the layers in connection with various QoS requirements. Due to the virtues and future potential IPv6 is selected as a protocol framework.

Traffic originating from the external network can be discriminated using either explicit or implicit discrimination mechanisms.

Flow discrimination and routing within the CCN is based on the network layer (i.e. IP). This enables the use of other proposals to support micro-mobility, like HAWAII and Cellular IP. Encapsulation of all datagrams in a new IP datagram within the CCN is likely to be the most appropriate solution.

In the present invention, this method provides a consistent access mechanism, thus eliminating the need to adapt applications or services residing on external networks (without losing the advantages obtained by application of the explicit discrimination mechanism).

An explanation of the functional modules of the structure and protocols employed in the present invention is presented below.

Figure 3:
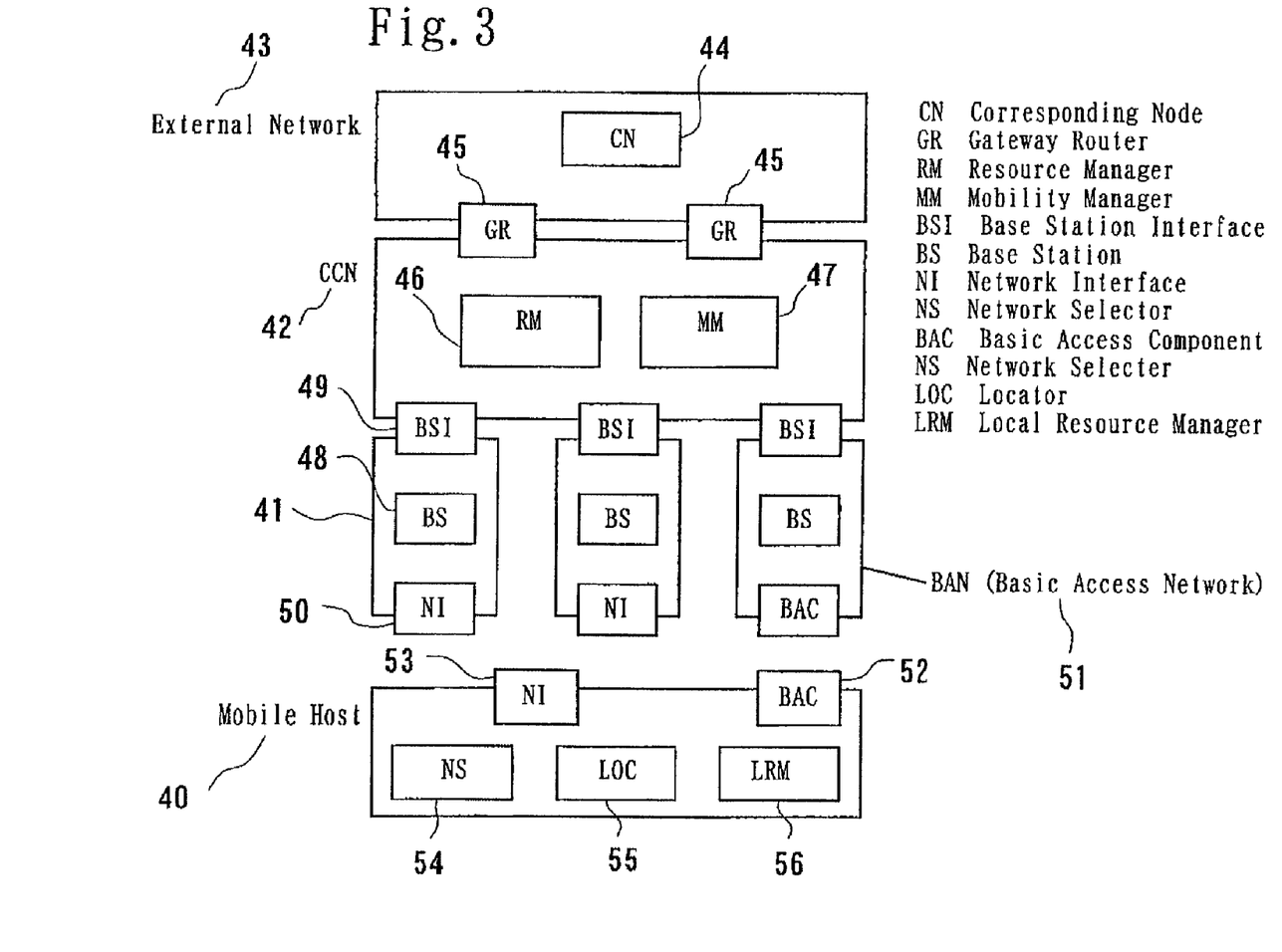
FIG. 3 is an explanatory diagram showing the architecture of a heterogeneous network according to the present invention.

The architecture as depicted in FIG. 3 consists of four major building blocks (40), (41), (42), (43): mobile hosts (40), WANs (41), CCN (42), and external network (43).

Within the external network (43) is the Corresponding Node (CN) (44). One or more Gateway Routers (GR) (45) connects the external network (43) to the CCN (42).

At the external network (43) Mobile IP is assumed. Here, the gateway router (45) plays an active role. Once tunneled packets reach the gateway destined for the mobile host, the gateway detunnels the packets and forwards them to the base station or access point.

Two important functional entities within the CCN (42) are the Resource Manager (RM) (46) and the Mobility Manager (MM) (47). They are primarily responsible for traffic distribution and mobility related issues.

The CCN (42) supports the communication to the base stations, and thus to the WANS (41). A base station or access point interface (BSI) (49) primarily provides a consistent access mechanism for the base station or access point (48) to the CCN (42). The BSI (49) is a component of the base station or access point (48).

The base station or access point (48) deals with normal link layer problems concerning wireless access and collects status information on the wireless network it supports. The base station or access point (48) uses a network interface (NI) (50) to access the network.

A primary component of a mobile host (40) is the Basic Access Component (BAC) (52) to communicate with the BAN (51). Besides this interface, it also has a Network Interface (53). In contrast to the NI (50) for the base station or access point, the current interface (53) is typically based on software radio technologies and can use a plurality of WANs (41).

A Network Selector (NS) (54) communicates with the Resource Manager (46) to tune the radio for the WAN (41) to use. A Network Selection Control protocol is used to enable the proper selection of the access network.

The Locator (LOC) (55) provides the RM (46) with location information of the mobile host (40). The Local Resource Manager (LRM) (56) deals with the local resources of the terminal, and interacts with the resource manager (46) at the CCN (42).

The mobile host (40) includes all standard transport protocols and wireless specific control services. The control messages are transparently sent between the core network (42) and mobile hosts' (40) functional entities.

The BAC (52) will be part of any mobile host (40). It is used as the primary component to communicate with the basic access network (51). The BAN (51) is used for various functions including signaling, synchronization, paging, locations, etc. Synchronization is important when the mobile host (40) has the capability to use multiple access networks.

If the network interface (NI) (53) for the mobile host (40) is implemented using software radio technologies, it is impossible to use a plurality of access networks simultaneously (except BAN).

To be able to schedule the access network a good synchronization mechanism is required. The Network Selector (NS) (54) is the entity that is able to select the required access network.

It communicates with the Resource Manager (46) residing at the CCN to determine what network should be used and when they are supposed to be operational.

Applications should be able to use the infrastructure and specify its traffic and QoS requirements. A QoS API is used by the applications to specify their needs, and establish a session. If they do not use this API, best-effort mechanisms will be used for their session.

The mobility and QoS managing method proposed by the present invention is compatible with fixed mobile IPv6 network techniques. Furthermore, a combination of these techniques and microcellular mobility solutions enables interaction between fixed network QoS techniques and wireless QoS techniques (corresponding to layers lower than the network layer).

This enables the wireless network to support IP packets with varying IP QoS parameters properly. As the core network QoS and flow management is independent of the deployed IP protocol suite, the system can be enhanced to support alternative IP techniques, such as differentiated services.

Since the architecture is built upon existing protocols and architectures for mobile computing, making a prototype of it at a smaller scale than the originally envisioned CCN, should not pose serious obstacles.

The present invention enables the construction of a network that utilizes multiple types of wireless communication systems in a manner optimal for their environments, while seamlessly integrating such systems to provide more efficient and advanced network services in general. In particular, the architecture created by the present invention can be used to effectively integrate systems.

What is claimed is:

1. A network system that seamlessly integrates wireless communication systems, such network system being characterized in that:

an architecture of the network system including a mobile host, a wireless access network, a basic access network independent from the wireless access network, a common core network, and an external network; the external network having a correspondent node;

the external network and the common core network being connected together via at least one gateway router;

the common core network having two functional modules including a resource manager and a mobility manager;

the wireless access network internally comprising at least one set of base stations or access points, base station or access point interfaces, and network interfaces;

the base station or access point interfaces realizing an access mechanism that enable access between the common core network and the base stations or access points;

the network interface of the wireless access network realizing an access mechanism that enables access between the base stations or access points and the mobile host;

the basic access network internally comprising a network interface of base stations or access points, base stations or access points, and a basic access component, the basic access network allowing the mobile host to determine a location of the mobile host;

the network interface of base stations or access points of the basic access network realizing an access mechanism that enables access between the common core network and base stations or access points; and the mobile host comprising at least a network interface, a network selector, a locator, a basic access component, and a local resource manager, the basic access component of the basic access network and the basic access component of the mobile host communicating with each other.

2. The network of claim 1, wherein the basic access network has a larger service coverage than the wireless access network.

3. The network of claim 1, wherein the basic access network provides discovery of available wireless system to the mobile host.

4. The network of claim 1, wherein the basic access network is used for paging.

5. The network of claim 1, wherein the basic access network provides low bandwidth messaging services including at least one of paging and broadcasting.

6. The network of claim 1, wherein the basic access network is dedicted only to low bandwidth messaging services including at least one of paging and broadcasting, discovering available wireless system to the mobile host, and allowing the mobile host to determine the location of the mobile host.

7. The network of claim 1, wherein the wireless access network and the basic access network are respectively dedicated to different specialized traffics for communicating with the mobile host.

* * * * *